United States Patent
Cochoy et al.

(10) Patent No.: US 6,462,506 B2
(45) Date of Patent: Oct. 8, 2002

(54) ELECTRIC GOLF CAR WITH LOW-SPEED REGENERATIVE BRAKING

(75) Inventors: John Cochoy, Evans; Carlton W. Hearn, Augusta, both of GA (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 09/736,657

(22) Filed: Dec. 14, 2000

(65) Prior Publication Data

US 2001/0043049 A1 Nov. 22, 2001

Related U.S. Application Data

(60) Provisional application No. 60/173,638, filed on Dec. 30, 1999.

(51) Int. Cl.[7] .................................................. H02P 7/42
(52) U.S. Cl. .................. 318/801; 318/139; 318/254; 318/800; 318/812; 318/813; 318/893; 318/287; 180/65; 388/801
(58) Field of Search ................................ 318/254, 139, 318/800, 801, 812, 813, 287, 493; 180/65; 388/801

(56) References Cited

U.S. PATENT DOCUMENTS

| | | | |
|---|---|---|---|
| 4,389,602 A | | 6/1983 | Post |
| 4,626,750 A | | 12/1986 | Post |
| 4,792,736 A | * | 12/1988 | Jimbo et al. ................. 318/338 |
| 5,247,253 A | | 9/1993 | Bowman |
| 5,261,025 A | | 11/1993 | Post et al. |
| 5,281,900 A | * | 1/1994 | Park ........................... 318/139 |
| 5,315,158 A | | 5/1994 | Danielson |
| 5,332,954 A | | 7/1994 | Lankin |
| 5,374,881 A | | 12/1994 | Post et al. |
| 5,453,672 A | * | 9/1995 | Avitan ........................ 318/493 |
| 5,477,116 A | | 12/1995 | Journey |
| 5,552,683 A | * | 9/1996 | Dargent ...................... 318/287 |
| 5,565,760 A | * | 10/1996 | Ball et al. ..................... 322/23 |
| 5,637,971 A | | 6/1997 | Pratt |
| 5,642,023 A | | 6/1997 | Journey |
| 5,708,343 A | * | 1/1998 | Hara et al. .................. 318/599 |
| 5,713,189 A | | 2/1998 | Toman |
| 5,764,009 A | * | 6/1998 | Fukaya et al. .............. 318/300 |
| 5,793,175 A | | 8/1998 | Journey |
| 5,814,958 A | | 9/1998 | Journey |
| 5,861,724 A | * | 1/1999 | Ackerson ..................... 318/376 |
| 5,963,706 A | * | 10/1999 | Baik ........................... 388/804 |
| 6,109,009 A | * | 8/2000 | Benson ........................ 56/10.2 |

* cited by examiner

Primary Examiner—Shih-Yung Hsieh
Assistant Examiner—Tyrone Smith
(74) Attorney, Agent, or Firm—Harness, Dickey & Pierce, P.L.C.

(57) ABSTRACT

A control system for an electric vehicle, such as a golf car, that includes a plurality of power MOSFETs. The vehicle includes a shunt wound motor including an armature coil and a field coil. One of the MOSFETs is connected in parallel across the armature coil and another MOSFET is connected in series with the armature coil. The MOSFET across the armature coil includes a freewheel diode. When the motor is operating below its base speed, i.e., when the back EMF is below the power supply voltage, a current flow can be induced by momentarily turning on the series MOSFET, shorting the armature coil. Because of the residual inductance in the motor, a current flow in the counter clockwise direction is initiated at which point the series MOSFET is turned off. Consequently, a large voltage spike across the motor occurs which results in current flow back into the battery pack. By quickly turning the series MOSFET on and off the current flow can be maintained, and the regenerative braking can occur even at slow speeds. The control system also allows the vehicle to be operated at speeds below its base speed, and provide field current control by measuring the armature current in the negative quadrant of the field map.

24 Claims, 2 Drawing Sheets

ELECTRIC GOLF CAR WITH LOW-SPEED REGENERATIVE BRAKING

CROSS-REFERENCE TO RELATED APPLICATIONS

This Application claims priority on U.S. Provisional Application No. 60/173,638, titled Electric Golf Cart Including Regenerative Braking To Zero, filed Dec. 30, 1999.

BACKGROUND OF THE INVENTION

1. Field of the Invention

This invention relates generally to a control system for an electric golf car and, more particularly, to a control system for an electric golf car that includes a regenerative braking system employing a half-bridge rectifier that provides regenerative braking to lower than base speed.

2. Discussion of the Related Art

All electric motors work on the principle that two magnetic fields in proximity will have a tendency to align themselves. One way to produce a magnetic field is to take a coil of wire and pass a current through it. If two coils with current passing through them are in proximity to each other, their respective magnetic fields will have a tendency to align themselves. If the two coils are between 0 and 180 degrees out of alignment, this tendency will create a torque between the two coils. If one of these coils is mechanically fixed to a shaft and the other is fixed to an outer housing, an electric motor is provided. The torque produced between these coils varies with the current in the coils.

Unfortunately, this motor will only turn half of a revolution before the fields line up. It is thus necessary to make sure that there is always an angle between the two coils so as to continue to produce torque as the motor shaft rotates through more than 180 degrees. A device that provides this function is called a commutator. The commutator disconnects the current from the active moving coil, referred to as the armature coil, and reconnects it to a second armature coil, before the angle between the armature coil and the field coil connected to the housing reaches zero. The ends of each of the armature coils have contact surfaces known as commutator bars. Contacts made of carbon, called brushes, are fixed to the motor housing. As the motor shaft rotates, the brushes lose contact with one set of bars and make contact with the next set of bars. This process keeps the angle between the active armature coil and the field coil relatively constant. This constant angle between the magnetic fields maintains a constant torque throughout the motor's rotation.

If a coil is moved in a magnetic field, a voltage and current are induced in the coil. If a current passes through the field coil and the armature coil is turned, a voltage and current are induced in the armature coil, effectively turning the motor into a generator. This has two important effects. When the motor is used to power an electric vehicle, such as an electric golf car, referred to as motoring, the rotation of the motor induces a voltage across the armature coil called back EMF (electro-motive force). This voltage goes up with the speed of the motor, and also with the field current. When the back EMF equals the voltage across the terminals of the motor, the top speed has been reached. The other effect is that if an electrical load is placed on the armature coil, and the armature coil is turned, the motor will act as a brake and generate power. This effect is known as regenerative braking. This is an electric motor where the torque produced varies with the current in the armature and field coils, and the speed varies with the applied armature voltage.

Examples of this regenerative type braking for an electric golf car can be found in U.S. Pat. No. 5,565,760 issued to Ball et al.; U.S. Pat. No. 5,814,958 issued to Journey; U.S. Pat. No. 5,332,954 issued to Lankin; and U.S. Pat. No. 4,626,750 issued to Post.

The speed of an electric vehicle will vary by varying the voltage applied to the motor. With a lower voltage, the back EMF of the motor reaches the applied voltage at a lower speed. There are two different ways to vary this voltage. The first is to insert resistors in series with the motor to lower the effective voltage to the motor. This is the way the industry used to control motor speed. Unfortunately, this method is extremely inefficient at lower speeds.

This inefficiency can be explained by Ohm's law and Kirchoff's current and voltage laws. Ohm's law states that:

$$V(\text{Voltage}) = I(\text{Current}) \times R(\text{Resistance})$$

from which:

$$P(\text{Power}) = I(\text{Current}) \times V(\text{Voltage}).$$

Kirchoff's law simply states that in a circuit, all the voltages must add up to zero, and all the currents must be the same in a given loop.

By Kirchoff's current law, the current through the battery, the resistor, the armature coil, and the field coil in an electric vehicle motor circuit must all be the same. Also, by Kirchoff's voltage law, the voltages across the resistor, the armature coil, and the field coil must all add up to the battery voltage (36 V in one example), so the sum of all of the voltages in the circuit equals zero.

Assume that certain driving conditions (grade, surface, tire pressure, load on the vehicle and desired speed) dictate that a current of 100 A at 18 V be across the motor (armature and field coils). The torque varies with current, and the speed varies with voltage. The circuit can be analyzed to determine how much power is lost in the resistor. By Kirchoff's law, the voltage across the resistor is given as:

$$V_{BATT} = V_{ARM} + V_{FIELD} + V_{RES}$$

$$36 = 18 + V_{RES}$$

$$V_{RES} = 18 \text{ Volts}$$

The current is 100A, therefore by Ohm's law the power lost in the resistor is given as:

$$P_{RES} = I_{RES} \times V_{RES}$$

$$P_{RES} = 100 \times 18 = 1800 \text{ watts.}$$

Also by Ohm's law the power being used by the motor is:

$$P = (V_{ARM} + V_{FIELD}) \times I$$

$$P = 18 \times 100 = 1800 \text{ watts.}$$

This means that half of the power coming out of the batteries is being lost to heat in the resistor. Under these conditions, the speed controller system uses half of the energy of the resistor system for the same performance.

In a resistor system, the resistance decreases as pedal position increases. In a speed controller system, the duty cycle increases as pedal position increases. Both ways effectively control the voltage to the motor, and therefore the speed of the vehicle. The difference in efficiency is less noticeable the closer to full throttle.

While conventional electric vehicles operate on the principles outlined above, there are different ways of controlling them. The standard electric golf car uses a series wound motor. A series wound motor has the field coils wound with a few turns of very heavy wire. In order to get maximum torque, the armature and field coils are connected in series. Other electric vehicles use shunt wound motors, where the field coil has many turns of smaller wires. In order to get maximum torque, the armature and field coils are connected in a parallel or "shunt" configuration. The strength of the magnetic field produced by a coil varies with the current passing through the coil and the number of turns in the coil. Therefore, the same field strength can be provided by passing less current through a shunt field winding. For example, the same field strength at 300 A in the series wound motor can be achieved with 15–20 A in the shunt wound motor. There are a couple of notable differences in the controller as well. Since less current is required to get the same field in a shunt wound motor, it gives the opportunity to control the field coil with a separate set of smaller power components. This is called separately excited control of the motor.

As discussed above, back EMF varies with the field strength, which varies with the field current. In a series wound motor, the armature current and the field current are the same, thus the relationship between the field strength and the armature current is a straight line. In a separately excited system, any field current can be chosen for a given armature current. As field current decreases, the field strength decreases. Thus, the back EMF is lowered, which increases the motor speed for a given armature current. This is called field weakening.

If the vehicle begins to roll backward down a hill while the field current is still active in the forward direction, it will generate current backward directly into the freewheel diode. Since the diode looks like a short circuit in that direction, this will cause the motor to act like a brake to a very slow speed. This type of braking is called plug braking.

If the vehicle has been stopped with the accelerator released for more than a predetermined period of time, the controller will de-energize the field coil and continue to monitor the speed sensor. If the vehicle begins to move without the accelerator being depressed, the controller will re-energize the field in the direction opposite of the vehicle motion to initiate plug braking.

SUMMARY OF THE INVENTION

In accordance with the teachings of the present invention, a control system for an electric vehicle, such as a golf car, is disclosed that includes a plurality of power metal-oxide semiconductor field effect transistors (MOSFETs). Four of the MOSFETs make up a full H-bridge, and two of the MOSFETs make up a half H-bridge. One of the MOSFETs in the half-bridge is connected in parallel across the armature coil and the other MOSFET in the half-bridge is connected in series with the armature coil. The parallel MOSFET across the armature coil includes a freewheel diode.

When the motor is operating below its base speed, i.e., when the back EMF is below the power supply voltage, a current flow can be induced by momentarily turning on the parallel MOSFET shorting the armature coil. Because of the inductance in the motor armature, a current flow in the counter clockwise direction is initiated at which point the series MOSFET is turned off. Consequently, a large voltage spike across the motor occurs which results in current flow back into the battery pack. By quickly turning the parallel MOSFET on and off using a technique referred to as pulse width modulation (PWM), the current flow can be maintained, and regenerative braking can occur even at slow speeds.

Additionally, control of the negative quadrant of the field map is possible due to the fact that the armature current is monitored. By varying the field current ($I_f$) to match a reference current ($I_{ref}$), the field map curves can be maintained. Further, because motor speed varies with armature voltage ($V_{ARM}$), the armature PWM signal can be used to control vehicle speed as opposed to the method of field current variation speed control in previous controllers. Also, through a closed control loop, the speed reference value (determined by pedal position) is compared to the actual speed value returned by the speed sensor. Adjustments are made to the armature PWM signal to vary vehicle speed in accordance with a throttle position input signal. And, in order to prevent irregular regenerative braking characteristics during low speed maneuvering, the speed is monitored and regenerative armature current limit ($I_{max}$) is reduced at low speeds.

Additional objects, advantages and features of the present invention will become apparent from the following description and the appended claims when taken in conjunction with the accompanying drawings.

DETAILED DESCRIPTION OF THE PREFERRED EMBODIMENTS

The following discussion of the preferred embodiments directed to a regenerative braking system for an electric golf car is merely exemplary in nature, and is in no way intended to limit the invention or its applications or uses.

Figure 1:
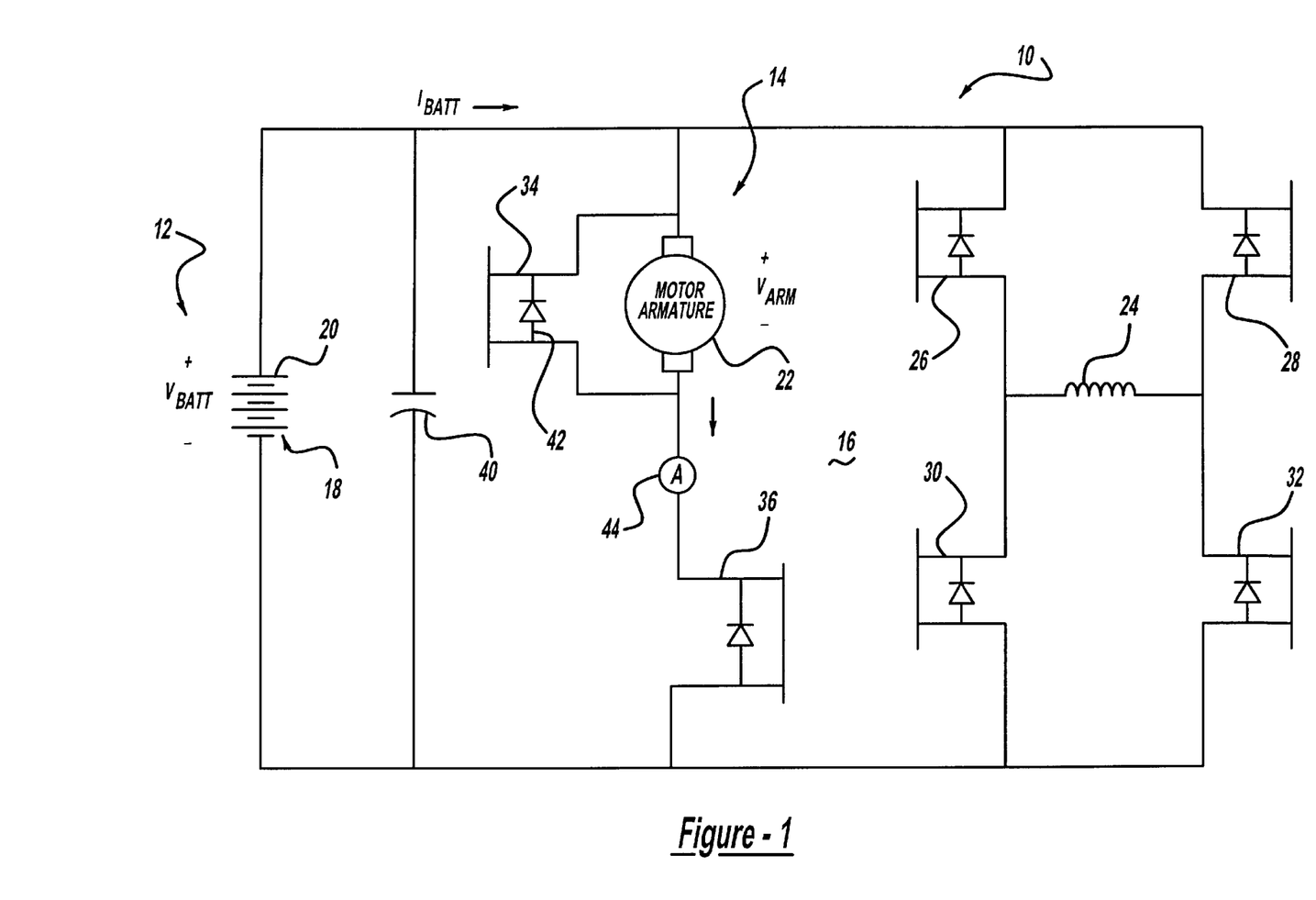
FIG. 1 is schematic diagram of the electrical system for an electric vehicle employing a half-bridge architecture, according to the invention.

FIG. 1 is a schematic diagram 10 of the electrical system for an electric vehicle, such as an electric golf car, that includes a regenerative braking system, according to an embodiment of the present invention. The diagram 10 includes a battery system 12, a motor 14 and a control system 16. The typical battery system 12 includes a battery pack 18 including individual batteries 20. In one embodiment, the battery pack 18 includes six 6 volt batteries for a total of 36 volts, where the batteries 20 are deep discharge lead acid batteries. The motor 14 includes a motor armature coil 22 and a field coil 24. The coils 22 and 24 in the motor 14 act as inductors. This means that once current is flowing through the coils 22 and 24, the current would tend to continue flowing.

A current sensor 44 is provided in the control system 16 to measure current through the armature coil 22. The current sensor 44 can be a coil of wire wrapped about a Hall effect integrated circuit. This effectively places the Hall effect circuit inside the magnetic coil loop, and the magnetic field it senses is proportional to the current $I_{ARM}$.

The control system 16 includes six power driving MOSFETs 26–36 and a capacitor 40. The MOSFETs 26–36 are in effect switches that can be turned on and off 15,000 times per second. Throughout this discussion, any mention of "MOSFET" can be construed to mean any one MOSFET or a plurality of MOSFETs connected in parallel and controlled by a single signal. The MOSFET 34 is connected across the motor armature coil 22, and includes a freewheel diode 42. The diode 42 acts like a one way valve for electricity, where electricity will only pass in the direction of the arrow of the symbol. In the known quarter bridge armature circuits, the freewheel diode 42 is a separate device. However, in the construction of the power MOSFET 34, the freewheel diode 42 is provided as an intrinsic part of the silicon.

The combination of the MOSFETs 26–32 make up an H-bridge, or a full bridge, and the MOSFETs 34 and 36 make up a half-bridge. The half-bridge controller refers to the half bridge architecture used for the motor armature coil 22, rather than the full bridge used for the field coil 24. The power driving MOSFETs 26–32 and the H-bridge construction are conventional. One uniqueness of the system 10 comes from the use of the two power MOSFETs 34 and 36 associated with the motor armature coil 22, and more particularly with the power MOSFET 34 and diode 42 in parallel across the motor armature coil 22 and the way they are driven. In the conventional DC motor drive systems used on conventional electric vehicles, there is only the series MOSFET 36 below the motor armature coil 22 and the freewheel diode 42.

The motor 14 is a shunt wound motor because the armature coil 22 and the field coil 24 are in parallel across the two main battery terminals. This operation can be seen for example when the series power MOSFET 36 of the motor armature coil 22 is turned on and the two opposed power MOSFETs 26 and 32 of the field coil 24 are turned on. In conventional separately excited systems, typically the speed of the motor 14 is achieved by varying the field current. In the present invention, the pulse width modulation (PWM) of the armature current ($I_{ARM}$) is used to control vehicle speed.

In this system, the logic circuitry in the control system 16 has control over whether the MOSFETs 26–36 are on or off. To control the effective voltage to the motor 14, the ratio of the amount of time the MOSFETs 26–36 are on versus the amount of time they are off is controlled. This ratio is called the duty cycle.

When the MOSFET 36 is on, the batteries 20 are connected directly across the armature 22. By Kirchoff's law, this means that the voltage across the batteries 20 and the voltage across the armature 22 are both 36 V. Also, by Kirchoffs law, the currents through the armature 22 and the batteries 20 are the same. Since the current in the circuit is flowing in the opposite direction of the arrow of the freewheel diode 42, the diode 42 can be ignored under this condition.

When the MOSFET 36 is off, the circuit with the batteries 20 is broken. Since there is current flowing through the armature 22, it will not want to stop. The freewheel diode 42 is the only part of the circuit left. If the current continues to flow at the same rate in the same direction as it did before, it will flow through the freewheel diode 42. The voltage across both the diode 42 and armature 22 will be near zero, but the current will remain the same. In the battery circuit there is no current since the circuit is not complete, but the battery voltage remains at 36 volts.

The voltage across the armature 22 is 36 V when the MOSFET 36 is on and zero when the MOSFET 36 is off. The average voltage across the motor 14 is given as:

$$V_{ARM}=(36V \times \text{duty cycle})+(0V \times (1-\text{duty cycle}))$$

$$V_{ARM}=36V \times \text{duty cycle}$$

The torque required to move the vehicle determines the motor current. Since the battery current is equal to the motor current when the MOSFET 36 is on and is zero when the MOSFET 36 is off, the battery current is:

$$I_{BATT}=(I_{ARM} \times \text{duty cycle})+(0A \times (1-\text{duty cycle}))$$

$$I_{BATT}=I_{ARM} \times \text{duty cycle}$$

Using the 100A and 18V example above with a solid state speed controller, the differences are given as:

$$V_{ARM}=36 \times \text{duty cycle}$$

$$18=36 \times \text{Duty Cycle}$$

$$\text{Duty Cycle}=50\%$$

$$I_{BATT}=I_{ARM} \times \text{duty cycle}$$

$$I_{BATT}=100A \times 50\%$$

$$I_{BATT}=50A$$

At this point, the power out of the batteries 20 and the power into the armature 22, can be calculated by the formula for power previously discussed. From the example above, it is known that the motor power under these conditions is 1800 watts.

$$P_{BATT}=I_{BATT} \times V_{BATT}$$

$$P_{BATT}=50A \times 36V=1800 \text{ watts}$$

Table I below summarizes the differences under these conditions for each of the two systems.

TABLE I

| System Type | Motor Power | Battery Power |
| --- | --- | --- |
| Resistor | 1800 watts | 3600 watts |
| Speed Controller | 1800 watts | 1800 watts |

The normal operation of the motor armature coil 22 in a Regenerative braking mode, for example when the vehicle is moving downhill, exists only when the speed of the motor 14 is above the base speed of the motor 14. Base speed is the speed at which the back EMF equals the battery voltage. When the back EMF equals or is below the battery voltage, it is normally not possible for the energy being generated by the motor 14 to flow back into the battery pack 18 because the battery voltage is too high. In order to overcome this limitation, the power MOSFET 34 in combination with the freewheel diode 42 was added. If the speed of the vehicle is below its base speed, this would be ineffective to charge the battery pack 18 for the reasons previously stated, and there would be no regenerative braking. To overcome this limitation, the MOSFET 34 is turned on briefly. Since the voltage drop across the MOSFET 34 when it is fully on is about zero, the motor 14 generates a large current, which runs very briefly through the MOSFET 34. Since this brief current cannot be stopped instantaneously, a large voltage in excess of the normal back EMF is generated, which is above the battery voltage. The motor armature coil 22 then pumps energy into the battery pack 18 for a brief period of time equal to the period of time required for the high voltage on the motor 14 to go from its peak down to the battery voltage.

This process is then repeated hundreds or thousands of times per second in order to cause the energy of the motor 14 to produce sufficiently high voltage to produce a regenerative braking effect across the battery pack 18, and thus slow down the motor 14.

It is important to note that by turning on the power MOSFET 34, the MOSFET 34 has the effect of applying a hard brake to the motor 14. This is a normal way to brake a DC motor, but would be objectionable if kept on too long. Therefore it is important to feather this braking action in one or more ways. However, the nature of the power MOSFET 34 requires that it be either on or off. Thus in order to produce a feathering effect, it is necessary to vary the armature PWM duty cycle to achieve the feathering. Table II below gives values for different PWM duty cycles for $V_{BAT}$, $I_{BATT}$, $I_{ARM}$ and $V_{ARM}$.

TABLE II

| % Duty Cycle | $V_{BATT}$ | $I_{BATT}$ | $I_{ARM}$ | $V_{ARM}$ |
|---|---|---|---|---|
| 50 | 36 | 150 | 300 | 18 |
| 10 | 36 | 30 | 300 | 3.6 |
| 100 | 36 | 300 | 300 | 36 |
| 0 | 36 | 0 | 0 | 0 |

The only time that armature voltage reverses is in the normal motoring mode when the series power MOSFET 36 is turned off. For that brief instant, the current continues to try to flow, and the armature voltage reverses and pushes current through the freewheel diode 42.

For conventional electric golf cars, the base speed of the motor 14 allows regenerative braking braking to occur at vehicle speeds above 10 miles an hour. Below 10 miles an hour there is no regenerative braking. Also, the regenerative braking is used to limit the downhill vehicle speed, even with the accelerator pedal completely depressed to 13 miles per hour for a more secure driving feel.

One important advantage of the present invention is that it allows the accelerator pedal to be used to slow the vehicle down to speeds as low as two miles per hour. In the past, known controllers only limited the speed of the vehicle when the pedal was completely released. In other words, if the accelerator pedal were pressed even slightly, this would allow the speed of the vehicle to reach the top speed of the motor 14 and the regenerative braking would kick in automatically only above that top speed. This can be undesirable on particularly steep slopes. In this invention, the accelerator pedal effectively works the same way, in terms of feel, as that of a vehicle with an internal combustion engine having a manual transmission, where the accelerator pedal is used to regulate directly the low speed of the vehicle to produce a relatively linear feel between pedal position and speed. In other words, by using the accelerator pedal for this invention, the speed can be regulated to 8 miles an hour, 6 miles an hour, 5 miles an hour or wherever the operator chooses to put the pedal.

The top speed of the vehicle is a settable parameter in the conventional controllers. This is the speed which the vehicle will obtain on level ground. When a vehicle crests over a hill and starts going downhill, the typical conventional controller is set up to hold that top speed as the vehicle goes down the hill, even though gravity would cause the vehicle to go faster.

To summarize, in conventional drive systems, pushing the pedal simply allows the vehicle to go from the base speed up to top speed, but does not give any control below the base speed of the motor. However, in the system of the present invention, the pedal position allows the speed of the vehicle to be controlled anywhere from just above near zero speed up to the top speed set by the control system 16 of the motor 14. This can be a linear relationship between the pedal position and the vehicle speed. However, it should be appreciated that this could also be a non-linear relationship if desired, for example, to provide greater sensitivity at lower speeds.

The back EMF of the motor 14 increases with motor speed and also with increasing field coil current. In the series wound motor, the motor armature coil 22 and the field coil 24 are connected in series, thus insuring that there is no independent control between the motor armature current and the field coil current, which always had to be the same. In the shunt wound motors, the motor armature coil 22 and the field coil 24 are completely separate so that the currents in these two circuits can be separately regulated. Accordingly, to reduce the back EMF of the motor, it is simply necessary to reduce the field coil current. This allows the motor controller designer more flexibility at achieving desired motor characteristics.

Figures 2, 3, 4, 5:
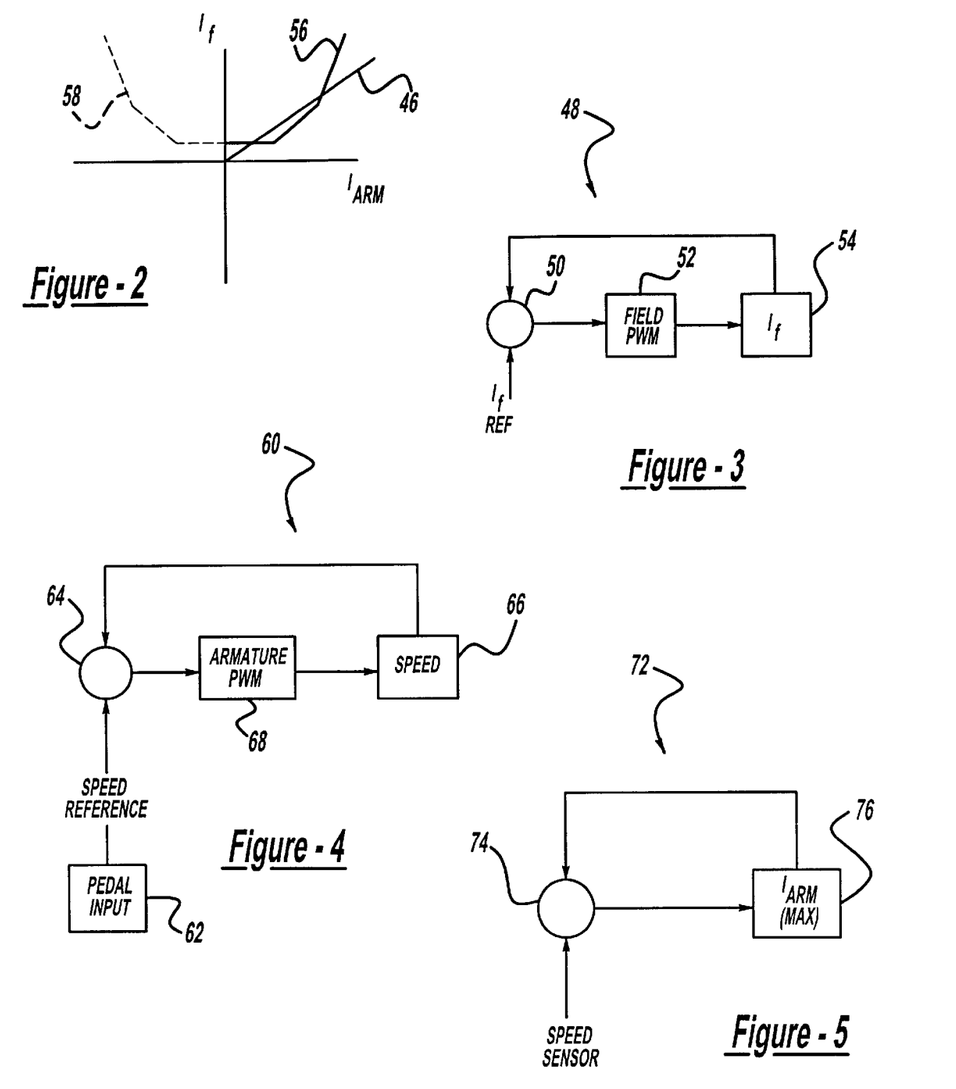
FIG. 2 is a motoring/regenerative field map.
FIG. 3 is a schematic block diagram showing control of the armature current in the electrical system shown in FIG. 1.
FIG. 4 is a schematic block diagram showing a closed control loop for determining a speed reference value based on accelerator pedal position.
FIG. 5 is a schematic block diagram showing vehicle speed being monitored and armature current being adjusted with respect to speed.

FIG. 2 is a typical field map. Field map is a term widely used in the industry for describing the relationship between armature and field current for a shunt wound electric motor. Each motor has a specific region on its field map in which its performance is optimal. Operation too far outside this region can result in permanent damage to the motor. Each motor has a specific region on its field map in which its performance is optimal. Operation too far outside this region can result in permanent damage to the motor.

The line 46 in the upper right quadrant of the field map represents the typical performance of the series wound motor with field current being a function of the independently controlled armature current. In the shunt wound motor systems, the field current and the armature current are independently controllable, thus resulting in a non-linear curve 56 as also shown in the upper right quadrant of FIG. 2. This particular field map thus allows for better performance under conditions which can be programmed into the conventional controllers. However, the conventional controllers using the quarter-bridge armature circuit with the freewheel diode 42 provided no control whatsoever in the upper left quadrant of the field map. The present invention however provides a technique for operating in the upper left quadrant of the field map on line 58.

In the known shunt wound motor system with the quarter-bridge controller, the armature current was actually measured due to the known resistance value of a power MOSFET 34. In other words, the armature current was measured by measuring the voltage across the power MOSFET 34. In the present system, the current sensor 44 is capable of measuring the armature current $I_{ARM}$ in the negative quadrant of the field map. Then according to the $I_{ARM}$ value that is detected, the controller selects the correct $I_f$ value from the graph. In the past, this armature current information was simply not available, thus making it impossible to regulate other variables based upon this information.

FIG. 3 is a feed-back loop diagram 48 that includes a summing junction 50 which has as field current reference input $I_{ref}$ and produces an input signal into a field PWM block 52 which then produces a pulse width modulated (PWM) field current. The pulse width modulated field current is then applied to a current source 54 that generates the field current If. The current $I_f$ is then fed back into the summing junction 50. The PWM field current actually ends up controlling an average voltage, and this may or may not achieve the desired field current. The problem with the field coil is that it is subject to changes in temperature which changes its resistance. Thus, for a given voltage, a different field current may result. By using the feedback loop of FIG. 3, the desired field current can be obtained independent of the temperature consideration. In addition, the field coil 24 is operating in a real environment where there may be magnetic fields induced by the armature or whatever. The feedback system of FIG. 3 also takes care of those types of ancillary factors which might otherwise tend to destabilize the $I_f$ signal that is desired.

One of the benefits of being able to regulate the negative quadrant operation of the field map of the motor 14 is that the motor 14 can be operated more reliably under all conditions. Typically, shunt wound DC motors operate under certain $I_f$ vs. $I_{ARM}$ conditions or ranges. Outside of that range, there is the possibility of damage to the motor 14 if operation in that condition in the long term were to take place. Accordingly, the reliability and serviceability of the motor 14 can be increased by insuring that in all instances, the $I_f/I_{ARM}$ recommendations are observed, including those which exist in the downhill regenerative conditions or other unusual environments where the motor 14 might be outside the normal $I_f/I_{ARM}$ desired operating range.

Note that this issue of the regenerative safe operating region really only comes into play with the larger vehicles, such as the five person golf cars. This is because typically, the smaller two person golf cars would not be operated in the undesirable $I_f/I_{ARM}$ region long enough to have any adverse effect upon the motor 14. This is a possibility on sufficiently hilly or mountainous courses, where the larger vehicles tend to stress the motor to a greater degree.

FIG. 4 is a block diagram 60 that shows the control of vehicle speed by using the armature PWM signal. An accelerator pedal position signal 62 is a speed reference signal, which is fed to a summing junction 64. The actual speed 66 of the vehicle is also sensed, and is fed to the summing junction 64. The comparison of the two signals provides a feedback signal which is then put into an armature PWM block 68 as an input signal. This produces an appropriate output PWM signal fed to the series MOSFET 36 in the motor armature coil 22, which then regulates the speed of the vehicle. More generally, the armature PWM block 68 operates both the series MOSFET 36 and the MOSFET 34 in parallel with the armature coil 22.

In order to achieve a desired motor speed, the voltage applied across the motor armature coil 22 must be regulated. This control of the voltage across the motor armature terminals is determined by operation of both of the power MOSFETs 34 and 36 for the armature coil 22. They can be operated in any way desired to achieve the desired motor voltage. Given the current speed of the vehicle which determines the speed of the motor 14, and thus the voltage of the back EMF, the desired voltage to be applied across the motor terminals can be calculated, and cause the power MOSFETs 34 and 36 to operate appropriately to achieve additional voltage to increase the motor speed. By taking the motor armature terminal voltage below the back EMF, regenerative braking will be induced. Thus, the voltage applied to the motor armature coil 22 can be regulated in any way desired throughout the right or left field quadrants of the field map.

The term "pedal up braking" is now used with regard to conventional shunt wound motor control systems. Basically, when the vehicle accelerator pedal is released, the control system 16 will actively implement a regenerative braking situation all the way down to the base speed of the motor 14, typically 10 miles per hour. Beyond that, there is no active control, since the regenerative braking characteristic of the motor 14 cannot provide enough back EMF to exceed the battery voltage. Thus, there is no regenerative braking. Since the present invention now provides regenerative braking below the base speed of the motor 14, the term "pedal up braking" can be used to a much lower speed than the base speed of the motor 14.

If the control system allowed a linear relationship between maximum $I_{ARM}$ and speed during low speed regenerative braking, the vehicle speed would slow too quickly when the pedal was released. Basically, this is similar in feel to driving around with the parking brake on. Fundamentally, as long as the vehicle speed is above the speed indicated by the pedal position, the vehicle would normally coast. In the improved system, if active regenerative braking is left on, that regenerative braking will in fact slow the vehicle down so quickly that this is objectionable. So this particular feature inhibits the low speed regenerative braking below a certain low speed setpoint which is safe to allow the vehicle to simply coast along. This set point can be anywhere from 2 to 8 miles per hour with perhaps 5 mile an hour being preferred for hilly terrain.

Figure 6:
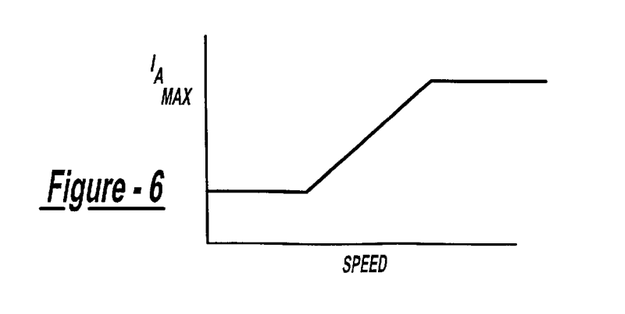
FIG. 6 depicts the relationship between maximum armature current $I_{ARM}$ and vehicle speed.

FIG. 5 and FIG. 6 show an example of how the armature current $I_{ARM}$ can be controlled between some minimum value and some maximum value as a function of speed. The maximum armature current is typically produced during the regeneration mode, where the current limit, is designed to protect the control system and commutator 16 from overheating. A speed sensor system 72 is shown including a summing junction 74 that receives a speed sensor signal as an input and a current signal from a current sensing circuit 76 representing the current sensor 44. The minimum armature current may be zero, or may be some value which does not produce excessive braking at low speeds.

From the discussion above, the control system for the electric vehicle of the invention offers advantages over those known in the art. These advantages include regenerative braking to lower than base speed. When the motor 14 is operating below its base speed, i.e., when the back EMF is below the power supply voltage, a current flow can be induced by momentarily turning on the MOSFET 34, shorting the armature coil 22. Because of the residual inductance in the motor 14, a current flow in the counter clockwise direction is initiated at which point the MOSFET 34 is turned off. Consequently, a large voltage spike across the motor 14 occurs which results in current flow back into the battery pack 18. By quickly turning the MOSFET 34 on and off the current flow can be maintained, and the regenerative braking can occur even at slow speeds.

Additionally, control of the negative quadrant of the field map is possible due to the fact that the armature current is monitored. By varying If to match $I_{REF}$ the field map curves can be maintained. Further, because motor speed varies with armature voltage ($V_{ARM}$), the armature PWM can be used to control vehicle speed as opposed to the method of field current variation speed control in previous controllers. Also, through a closed control loop, the speed reference value (determined by pedal position) is compared to the actual speed value returned by the speed sensor. Adjustments are made to the armature PWM to vary vehicle speed in accordance with a throttle position input signal. And, in order to prevent jerky regenerative braking characteristics during low speed maneuvering, the speed is monitored and regenerative armature current limit ($I_{max}$) is reduced at low speeds.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A control system for controlling the current and voltage of an electric shunt wound motor associated with an electric vehicle, said motor including an armature coil and a field coil, said system comprising:

a plurality of switching devices electrically coupled in an H-bridge circuit and electrically coupled to the field coil;

a plurality of switching devices electrically coupled in a half H-bridge circuit, wherein a first switching device Is electrically coupled in parallel with the armature coil and a second switching device is electrically coupled in series with the armature coil; and a freewheel diode electrically coupled in parallel with the armature coil; and means for measuring armature current in a negative quadrant of a field coil map, said system selecting a field coil current for controlling the field coil based on the measured armature current.

2. The system according to claim 1 wherein the freewheel diode is formed as part of a MOSFET device, said MOSFET device being the first switching device.

3. The system according to claim 1 wherein the plurality of switching devices in the H-bridge circuit and the half H-bridge circuit are MOSFET devices.

4. The system according to claim 1 further comprising means for switching the first switching device on and off so as to control the armature current traveling through the armature coil to provide regenerative braking of the speed of the electrical vehicle from a base speed to zero.

5. The system according to claim 4 wherein the means for switching includes means for controlling an armature pulse width modulation (PWM) signal so as to control the speed of the electric vehicle below its base speed.

6. The system according to claim 5 wherein the means for controlling includes a pedal position device for determining an accelerator pedal position, a speed sensing device for determining the speed of the vehicle and an armature PWM control circuit for generating the armature PWM signal, said pedal position device generating a speed reference signal and said speed sensing device generating a speed sensor signal, said speed sensor signal and said speed reference signal being applied to a summing junction, said summing junction generating a speed signal that is applied to the armature control circuit.

7. The system according to claim 5 wherein the PWM signal is applied to the second switching device.

8. The system according to claim 1 further comprising means for controlling motor armature current between a minimum value and a maximum value as a function of speed.

9. The system according to claim 8 wherein the means for controlling includes a speed sensor circuit having a summing junction responsive to a speed sensor signal and responsive to a current sensor signal from a current sensing circuit, said summing junction generating a controlled speed sensor signal for controlling the speed of the vehicle.

10. The system according to claim 1 further comprising means for generating a field current, said means for generating a field current including a summing junction responsive to and summing the field current and a field current reference signal, and including a field pulse width modulation (PWM) circuit generating a PWM signal from the summed signal.

11. The system according to claim 1 wherein the electric vehicle is an electric golf car.

12. An electric golf car including a braking system, a battery system and a shunt wound motor, said motor having an armature coil and a field coil, said golf car comprising:

a plurality of MOSFET devices electrically coupled in a H-bridge circuit and electrically coupled to the field coil;

a plurality of MOSFET devices electrically coupled in a half H-bridge circuit, wherein a first MOSFET device is electrically coupled in parallel with the armature coil and a second MOSFET device is electrically coupled in series with the armature coil;

a freewheel diode electrically coupled in parallel with the armature coil;

a current sensor for measuring armature current through the armature coil;

a speed pedal position switch for determining the position of an accelerator pedal of the golf car, said pedal position switch generating a speed reference signal; and a control system, said control system switching the first MOSFET device on and off so as to control the armature current traveling through the armature coil to provide regenerative braking of the speed of the golf oar from a base speed to zero, wherein the control system includes means for measuring armature current in a negative quadrant of a field coil map, said control system selecting a field coil current for controlling the field coil based on the measured armature current.

13. The golf car according to claim 12 further comprising a speed sensor circuit for determining the speed of the vehicle and an armature PWM control circuit for generating an armature pulse width modulation (PWM) signal, said pedal position switch determining the speed of the vehicle and said speed sensor circuit generating a speed sensor signal, said speed sensor signal and said speed reference signal being applied to a summing junction, said summing junction generating a speed signal that is applied to the armature control circuit.

14. The golf car according to claim 13 wherein the PWM signal is applied to the second MOSFET device.

15. The golf car according to claim 12 wherein the control system includes means for controlling motor armature current between a minimum value and a maximum value as a function of speed.

16. The golf car according to claim 12 wherein the control system includes means for generating a field current, said means for generating a field current including a summing junction responsive to and summing the field current and a field current reference signal, and including a field pulse width modulation (PWM) circuit generating a PWM signal from the summed signal.

17. A method of controlling the speed of an electric vehicle, said electric vehicle including a shunt wound motor having an armature coil and a field coil, said method comprising the steps of:

electrically coupling a first switching device in parallel across the armature coil of the motor;

providing a current path in parallel to the first switching device to dissipate a residual current through the armature;

turning the switching device on and off to control the armature current through the armature coil so as to provide regenerative braking below a base speed of the motor; and measuring armature current in a negative quadrant of a field map coil, and controlling the field coil current based on the measured armature current.

18. The method according to claim 17 wherein the step of electrically coupling a first switching device includes electrically coupling a MOSFET device in parallel with the armature coil.

19. The method according to claim 17 further comprising the step of electrically coupling a second switching device in series with the armature coil.

20. The method according to claim 17 further comprising the step of controlling the vehicle speed between zero and the base speed of the motor.

21. The method according to claim 20 wherein the step of controlling the vehicle speed below the base speed includes controlling a pulse width modulation signal applied to the armature coil and sensing accelerator pedal position and vehicle speed.

22. The method according to claim 20 wherein the step of controlling the vehicle speed includes applying the PWM signal to a switching device in electrical series with the armature coil.

23. The method according to claim 17 further comprising the step of controlling motor armature current between a minimum value and a maximum value as a function of speed.

24. The method according to claim 23 wherein the step of controlling armature current includes determining armature current, determining vehicle speed, and combining the vehicle speed and the armature current to control the speed of the vehicle.

* * * * *

UNITED STATES PATENT AND TRADEMARK OFFICE
CERTIFICATE OF CORRECTION

PATENT NO. : 6,462,506 B2 Page 1 of 1
DATED : October 8, 2002
INVENTOR(S) : John Cochoy et al.

It is certified that error appears in the above-identified patent and that said Letters Patent is hereby corrected as shown below:

Column 7,
Line 32, delete second occurrence of "braking"

Column 8,
Lines 27-30, delete "Each motor has a specific region on its field map in which its performance is optimal. Operation too far outside this region can result in permanent damage to the motor"
Line 64, "If" should be -- $I_f$ --

Column 10,
Line 22, "mile" should be -- miles --
Line 54, "If" should be -- $I_f$ --

Column 11,
Line 19, "Is" should be -- is --

Column 12,
Line 31, "oar" should be -- car --

Signed and Sealed this

Sixteenth Day of December, 2003

JAMES E. ROGAN
*Director of the United States Patent and Trademark Office*